July 1, 1958     A. W. SCHMIDT     2,841,505
METHOD OF MANUFACTURING CATHODE-RAY TUBES
Filed Aug. 3, 1956
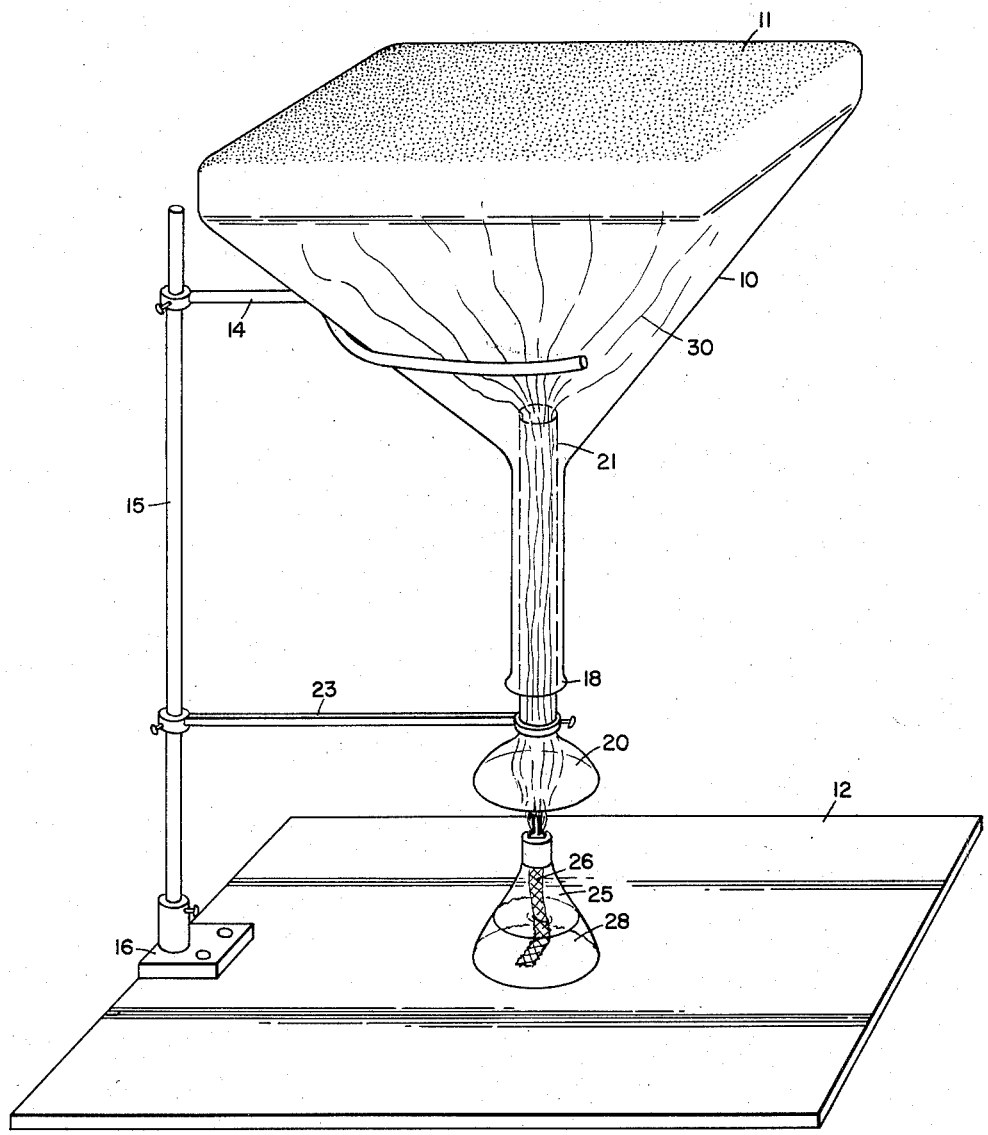
ADOLPH W. SCHMIDT
*INVENTOR.*
BY
HIS ATTORNEY.

2,841,505
METHOD OF MANUFACTURING CATHODE-RAY TUBES

Adolph W. Schmidt, Norwood Park, Ill., assignor to The Rauland Corporation, a corporation of Illinois Application August 3, 1956, Serial No. 602,018

5 Claims. (Cl. 117—18)

This invention relates to a method of manufacturing cathode-ray tubes and more particularly it relates to a method for improving the cross-burn resistance of cathode-ray tube luminescent screens.

The phenomenon of cross-burn of the luminescent screen of a cathode-ray tube has been the subject of a considerable amount of discussion and research; several methods of avoiding cross-burn are presently utilized by the industry. Cross-burn manifests itself as a darkened area on the luminescent screen which appears during the otherwise useful life of the tube. In a rectangular tube, it usually begins as a small circular area in the center of the screen from which the burned area gradually extends along four distinct paths in the direction of the four corners of the screen; after a time, the burned areas resemble the letter X—hence the name "cross-burn." In some cases the burning starts from the periphery of the screen and progresses inwardly; the burn sometimes resembles the shape of a butterfly.

Apparently, cross-burn occurs when the secondary-emission ratio of the luminescent material becomes less than unity whereupon a negative charge builds up on the screen surface. It has been suggested that this negative charge attracts positive ions within the tube envelope which impinge upon the screen and cause the burn. Whatever is the precise mechanism causing the cross-burn, it limits the satisfactory useful life of the tube and causes customer dissatisfaction.

One conventional method of avoiding cross-burn is to utilize a treated phosphor, such as the so-called "silicized-phosphor" or some other phosphor the individual particles of which have been coated previously with some material by the phosphor manufacturer, as the luminescent material. Although satisfactory cross-burn resistance has been obtained in this manner, the method is disadvantageous in that, when the phosphor is sufficiently treated to result in satisfactory cross-burn resistance, the phosphor particles have insufficient adherence to the glass faceplate of the tube envelope when processed by normal methods to give otherwise satisfactory screens.

Cross-burn also is avoided by aluminizing the screen surface; this method involves coating the backside of the luminescent screen with a layer of aluminum. However, there is a continued demand for non-aluminized cathode-ray tubes because of the difference in production cost and because the improved image-reproduction characteristics of the aluminized screens is sometimes not required, particularly in smaller tubes. Therefore, a substantial portion of tube production is directed to the manufacture of non-aluminized cathode-ray tubes.

It is accordingly an object of the present invention to provide a new and improved method for manufacturing cathode-ray tube luminescent screens.

It is another object of the present invention to provide an improved method for increasing the resistance of the luminescent screen to cross-burn.

It is a further object of the present invention to provide an improved method of forming a cross-burn resistant luminescent screen in which the luminescent material has good adherence to the cathode-ray tube envelope.

Still another object of the invention is to provide a method of improving the cross-burn resistance of a cathode-ray tube luminescent screen which is readily adaptable to assembly line manufacturing techniques.

In accordance with the invention, the cross-burn resistance of a cathode-ray tube luminescent screen is improved by forming, in situ on the luminescent screen, a layer of silicon dioxide particles having a predominant or charactertistic dimension of less than one micron. In a more detailed aspect of the invention, the cross-burn resistance of the luminescent screen is improved by precipitating silicon dioxide particles onto the screen from a cloud having silicon dioxide particles suspended therein.

The features of the present invention which are believed to be novel are set forth with particularity in the appended claims. The organization and manner of operation of the invention, together with further objects and advantages thereof, may best be understood by reference to the following description taken in connection with the accompanying drawing, in which the single figure illustrates an exemplary apparatus suitable for use in carrying out the present invention.

There are numerous well known methods for affixing a layer of luminescent material onto the envelope of a cathode-ray tube bulb. One of the most conventional methods involves placing a quantity of settling liquor into the envelope which is oriented to dispose its neck portion uppermost. Such settling media may be composed of deionized water and a salt such as barium nitrate. A slurry of phosphor particles suspended in deionized water mixed with potassium silicate is then dispersed into the settling liquor, after which the phosphor is permitted to settle through the liquor onto the faceplate. Subsequently, the envelope is tilted to decant the remaining settling liquor and the deposited phosphor screen is then permitted to dry.

In a typical process for depositing the so-called silicized phosphor particles onto the tube envelope of a standard commercial 17-inch cathode-ray tube envelope, the settling liquor is composed of approximately 6800 milliliters of deionized water to which is added about 3.6 grams of barium nitrate. The slurry which is then dispersed into the settling liquor is composed of 5 grams of a commercially available 0.3% silicized phosphor, 160 milliliters of a commercial grade, concentrated, 3.5 mole-ratio aqueous solution of potassium silicate, and 270 milliliters of deionized water. After the slurry is sprayed into the settling liquor, the phosphor particles are allowed to settle for approximately 20 minutes.

After the luminescent screens produced by the above process are thoroughly dried, they have an adherence against blow-off, by a stream of compressed air directed against the screen from a jet 1/16 inch in diameter placed 3/16 inch from the screen surface, of between 10 and 20 pounds per square-inch air pressure. This amount of adherence is sufficient to insure that the deposited phosphor material does not come loose from the tube envelope during subsequent handling of the tube.

Although the above described process yields a screen of usually satisfactory adherence characteristics, the screen thus produced generally is unsatisfactory from the standpoint of cross-burn resistance; that is, an overly large number of the tubes embodying such screens develop cross-burn before expiration of their otherwise useful life. To increase the cross-burn resistance of this screen, the amount of silicizing may be increased; for example, if a standard 1.5% silicized phosphor is utilized instead of the 0.3% silicized phosphor, the cross-burn resistance is considerably improved. At the same time however, the adherence becomes unsatisfactory, becoming substantially less than that for the 0.3% silicized phosphor. Thus, in order to employ a treated phosphor, a compromise must be made between good adherence and good cross-burn resistance.

By employing the method of the present invention, a cross-burn resistant luminescent screen is produced which retains satisfactory adherence characteristics; there is no compromise between good cross-burn resistance and good adherence. In preparing the luminescent screen for use with the present invention, a considerable economy in processing chemicals may be achieved. In a typical example, the settling solution is composed of 6800 milliliters of deionized water to which is added only 1.44 grams of barium nitrate. The powder slurry which is then sprayed into the settling solution comprises approximately 380 milliliters of deionized water to which is added about 5 grams of a commercial, untreated phosphor and only 50 milliliters of 3.5 mole-ratio aqueous potassium silicate solution. As above, the phosphor is allowed to settle for about 20 minutes after which the screen is permitted to dry. Screens produced by this latter process have an adherence which is sufficient to resist blow-off by the same air stream of 10 to 20 pounds per square inch through the 1/16 inch diameter jet placed 3/16 inch from the screen surface.

Of course, the production of luminescent screens with non-silicized phosphors is well known; the principal reason manufacturers began using a silicized phosphor was to improve cross-burn resistance. However, as is pointed out above, a compromise in performance characteristics is entailed in the use of treated phosphors.

The inventive method permits utilization of a luminescent screen which, although formed with untreated particles of a luminescent material, has completely satisfactory resistance to cross-burn. The invention contemplates a method of forming minute particles of silicon dioxide onto the already deposited luminescent screen. The simple step of forming discrete particles of silicon dioxide directly onto the screen provides a cathode-ray tube which is capable of giving long and continuous useful service without development of cross-burn, while permitting the formation of the screen itself with untreated luminescent materials having satisfactory adherence characteristics and very good light-output qualities.

The drawing illustrates a laboratory set-up exemplifying one method of forming the discrete silicon dioxide particles onto the previously deposited screen. In this figure, a cathode-ray tube bulb 10, having a luminescent screen 11 previously formed on its faceplate as by the above described process utilizing untreated phosphors, is supported above a table 12 by a bracket 14 clamped to a ring stand 15 mounted on table 12 by a clamp-plate 16. Bulb 10 is carried with its neck 18 facing downwardly and spaced above table 12. An inverted funnel 20 is supported, by a bracket 23 clamped to ring stand 15, to project the stem 21 of funnel 20 upwardly within neck 18. A burner 25 is placed on table 12 directly below funnel 20; burner 25 is of a conventional type, usually called an "alcohol-burner," and includes a wick 26.

Burner 25 contains a siliceous compound, such as a liquid organic silicate 28, which upon decomposition produces a smoke in which particles of silicon dioxide are suspended; preferably liquid 28 is ethyl silicate. When wick 26 is ignited, smoke resulting from the combustion of the ethyl silicate in the presence of oxygen contained in the surrounding air rises upwardly through stem 21 and forms a cloud 30 within bulb 10 in which silicon dioxide particles are suspended. The amount of smoke thus introduced into bulb 10, and hence the quantity of silicon dioxide particles suspended therein, is a function of the burning time of wick 26; preferably, wick 26 is permitted to burn for approximately 20 to 30 seconds.

After formation of cloud 30, bulb 10 is inverted whereupon the silicon dioxide particles, which have a predominant or maximum characteristic dimension of less than one micron, settle out of cloud 30 onto screen 11. The silicon dioxide particles adhere to screen 11 by virtue of the inter-molecular forces between screen 11 and the particles. Thus, a very simple process, in which a cloud suspension of silicon dioxide particles is introduced into bulb 10, causes the formation of a layer of discrete silicon dioxide particles in situ over the surface of screen 11.

Alternatively, a volatile suspension of silicon dioxide particles is sprayed onto screen 11; after removal of the volatile products, leaving a deposit of silicon dioxide particles on screen 11, bulb 10 is baked in accordance with conventional practice. In another alternative of the present invention, drops of a siliceous organic compound, such as ethyl silicate, capable of producing silicon dioxide upon decomposition are deposited onto a red-hot filament whereupon the solution decomposes and produces a smoke which is introduced into bulb 10; bulb 10 is then inverted, if it was not initially disposed with its faceplate lowermost, to permit the silicon dioxide particles to settle onto screen 11 where they are bound by inter-molecular forces.

It will be readily apparent that the method of the invention is capable of adaptation to high-volume assembly line techniques. Preferably, the cloud suspension of silicon dioxide particles is introduced into bulb 10 prior to the conventional step of baking the previously screened bulbs in an oven to evaporate all moisture and to volatilize undesired chemicals left in screen 19 from the screen forming process. Of course, the silicon dioxide can be deposited onto a silicized phosphor screen, such as that produced by the first above described 0.3% silicized phosphor screening method, to obtain satisfactory cross-burn resistance with that phosphor; however, as explained, better adherence is obtained with an untreated phosphor.

By utilizing the method of the present invention in the manufacture of a cathode-ray tube, a luminescent screen, formed with untreated phosphor particles, is produced which has good adherence to the tube envelope and yet which also has very good cross-burn resistance.

While a particular embodiment of the present invention has been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. A method of improving the cross-burn resistance of a luminescent screen deposited onto the faceplate of a cathode-ray tube bulb, said method comprising: placing said bulb in an upright position with said faceplate uppermost; introducing a cloud, having silicon dioxide particles suspended therein, into said cathode-ray tube bulb; inverting said cathode-ray tube bulb; and retaining said cloud in said inverted bulb for a period of time sufficient to permit said silicon dioxide particles to settle out of said cloud onto said deposited luminescent screen.

2. A method of improving the cross-burn resistance of a luminescent screen deposited onto the faceplate of a cathode-ray tube bulb, said method comprising: placing said bulb in an upright position with said faceplate uppermost; decomposing a siliceous compound in the presence of oxygen to produce a smoke having particles of silicon dioxide suspended therein; introducing said smoke into said cathode-ray tube bulb; inverting said cathode-ray tube bulb; and retaining said smoke in said inverted bulb for a period of time sufficient to permit said silicon dioxide particles to precipitate out of said smoke onto said deposited luminescent screen.

3. A method of forming a cross-burn resistant luminescent screen on the faceplate of a cathode-ray tube envelope, which method comprises: depositing uncoated phosphor particles on said faceplate to form said luminescent screen; and forming, in situ on said luminescent screen, a layer of discrete silicon dioxide particles having a predominant dimension of less than one micron.

4. A method of forming a cross-burn resistant luminescent screen on the faceplate of a cathode-ray tube envelope, which method comprises: depositing uncoated phosphor particles on said faceplate to form said luminescent screen; introducing a cloud, having silicon dioxide particles suspended therein, into said cathode-ray tube envelope; and retaining said cloud in said envelope for a period of time sufficient to permit said silicon dioxide particles to precipitate out of said cloud onto said luminescent screen.

5. A method of forming a cross-burn resistant luminescent screen on the faceplate of a cathode-ray tube envelope, which method comprises: depositing uncoated phosphor particles on said faceplate to form said luminescent screen; decomposing a siliceous compound in the presence of oxygen to produce a smoke having particles of silicon dioxide suspended therein; introducing said smoke into said cathode-ray tube envelope; and retaining said smoke in said envelope for a period of time sufficient to permit said silicon dioxide particles to precipitate out of said smoke onto said luminescent screen.

References Cited in the file of this patent

UNITED STATES PATENTS

| | | |
|---|---|---|
| 2,151,496 | Beese | Mar. 21, 1939 |
| 2,303,563 | Law | Dec. 1, 1942 |
| 2,442,976 | Heany | June 8, 1948 |
| 2,621,997 | Benes | Dec. 16, 1952 |